(12) United States Patent
Parker et al.

(10) Patent No.: US 8,094,583 B2
(45) Date of Patent: Jan. 10, 2012

(54) ARRANGEMENT AND METHOD RELATING TO ROUTING OF IP TRAFFIC IN MOBILE WIRELESS NETWORKS

(75) Inventors: Daryl Parker, Athlone (IE); Sandra Collins, Dublin (IE); Liam Fallon, Athlone (IE); Samir Ghamri Doudane, Paris (FR); Yang Cheng Huang, Greater London (GB); Francoise Sailhan, Paris (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 12/443,715

(22) PCT Filed: Oct. 5, 2006

(86) PCT No.: PCT/EP2006/067109
§ 371 (c)(1),
(2), (4) Date: Mar. 31, 2009

(87) PCT Pub. No.: WO2008/040392
PCT Pub. Date: Apr. 10, 2008

(65) Prior Publication Data
US 2010/0020721 A1 Jan. 28, 2010

(51) Int. Cl.
*H04W 4/00* (2009.01)
(52) U.S. Cl. .................. 370/254; 370/338; 370/400
(58) Field of Classification Search ................ None
See application file for complete search history.

(56) References Cited

OTHER PUBLICATIONS

Jodra, J. L. et al. "Service Discovery Mechanism Over OLSR for Mobile Ad-hoc Networks." 20th International Conference on Advanced Information Networking and Applications, 2006 (AINA 2006), Vienna, Austria, Apr. 18-20, 2006, pp. 534-542.
Badis, H. et al. "Quality of Service for Ad hoc Optimized Link State Routing Protocol (QOLSR)." IETF MANET Working Group, Internet Draft, Mar. 2006.
Oran, David, "OSI IS-IS Intra-Domain Routing Protocol", Network Working Group Request for Comments: 1142, Feb. 1990, pp. 1-157, Littleton, MA.

*Primary Examiner* — John Pezzlo
*Assistant Examiner* — Matthew Campbell
(74) *Attorney, Agent, or Firm* — Coats & Bennett, P.L.L.C.

(57) ABSTRACT

The present invention relates to a proactive optimized link state protocol and a node with routing means supporting such a protocol implementing multipoint relaying for distribution of control messages, e.g. comprising hello messages, which are extended and comprise neighbour information, link status information and resource related information, and second control messages, e.g. TC messages comprising information relating to MPR selectors which are extended to also hold information of a shared information repository (4) adapted to hold generic service related information. Internal information repositories ($2_{31i}$, $2_{32}$, $2_{33}$) are extended to additionally hold resource related information for neighbours, neighbour links and multipoint relay selectors. The protocol implements cross-layer ($2_1$, $2_2$, $2_3$) communication.

45 Claims, 11 Drawing Sheets

| MPR SELECTOR ADDRESS |
|---|
| RESOURCE ID |
| RESOURCE STATE VALUE |
| RESOURCE STATE VALID TIME |
|  |
| RESOURCE ID |
| RESOURCE STATE VALUE |
| RESOURCE STATE VALID TIME |
| MPR SELECTOR ADDRESS |
| RESOURCE ID |
| RESOURCE STATE VALUE |
| RESOURCE STATE VALID TIME |

| NEIGHBOUR ADDRESS |
| RESOURCE ID |
| RESOURCE STATE VALUE |
| RESOURCE STATE VALID TIME |
| |
| RESOURCE ID |
| RESOURCE STATE VALUE |
| RESOURCE STATE VALID TIME |
| NEIGHBOUR ADDRESS |
| RESOURCE ID |
| RESOURCE STATE VALUE |
| RESOURCE STATE VALID TIME |

| RESERVED | HTIME | WILLINGNESS |
|---|---|---|
| LINK | RESERVED | LINK MESSAGE |
| NEIGHBOUR ADDRESS | | |
| NEIGHBOUR ADDRESS | | |
| | | |
| LINK | RESERVED | LINK MESSAGE |
| NEIGHBOR ADDRESS | | |
| NEIGHBOR ADDRESS | | |
| | | |

STATE OF THE ART

*Fig. 7A*

| RESERVED | HTIME | WILLINGNESS |
|---|---|---|
| LINK | RESERVED | LINK MESSAGE |
| NEIGHBOUR ADDRESS | | |
| RESOURCE ID | | |
| RESOURCE STATE VALUE | | |
| NEIGHBOUR ADDRESS | | |
| RESOURCE ID | | |
| RESOURCE STATE VALUE | | |
| | | |
| LINK | RESERVED | LINK MESSAGE |
| NEIGHBOR ADDRESS | | |
| RESOURCE ID | | |
| RESOURCE STATE VALUE | | |

*Fig. 7B*

| ANSN | RESERVED |
|---|---|
| MPR SELECTOR ADDRESS | |
| MPR SELECTOR ADDRESS | |
|  | |
| MPR SELECTOR ADDRESS | |

STATE OF THE ART

*Fig. 8A*

| ANSN | RESERVED | |
|---|---|---|
| INFO | INFO BLOCK | RESERVED |
| INFO BLOCK 1 | | |
| INFO | INFO BLOCK | RESERVED |
| INFO BLOCK 2 | | |
|  | | |
| MPR | MPR SELECTOR | RESERVED |
| MPR SELECTOR ADDRESS | | |
| RESOURCE ID | RESOURCE STATE | |
| RESOURCE ID | RESOURCE STATE | |
|  | | |

*Fig. 8B*

ARRANGEMENT AND METHOD RELATING TO ROUTING OF IP TRAFFIC IN MOBILE WIRELESS NETWORKS

TECHNICAL FIELD

The present invention relates to routing of IP packets in a wireless network. Particularly it relates to a network node in a mobile wireless network which comprises means for routing IP traffic, which support a proactive optimized link state routing protocol implementing so called multipoint relaying for distribution of control messages. The invention also relates to a proactive optimized link state routing protocol implementing multipoint relaying, and to a method of routing IP packets in a wireless network, for example a mobile ad hoc network, using a proactive optimized link state routing protocol implementing multipoint relaying (MPR).

BACKGROUND

Mobile wireless networks are becoming more and more important and the sizes of the mobile networks tend to increase. Such mobile networks are particularly mobile ad hoc networks, and for example they may operate in groups which are independent and contain for example up to hundreds of nodes. With an increasing network size the nodes may be spread out in areas which are larger than the actual radio coverage of the individual nodes. Routing techniques then have to be implemented to make it possible for such nodes which are out of range to communicate with each other via intermediate nodes. Generally, to provide for appropriate routing in such mobile ad hoc networks using a routing protocol is different from, and much more complex than in wired networks with static nodes. Two important factors to take into account are that the mobile ad hoc networks normally have a limited bandwidth and high rate of topological changes. Therefore routing protocols are needed which aim at minimizing the control traffic at the same time as rapidly adapting to link failures and additions caused by node movements. Due to the fact that mobile ad hoc networks tend to grow in size, there are problems with scaling up. Classical protocols such as routing Internet protocol (RIP) and routing shortest path first (OSPF) are not convenient e.g. due to the fact that they generate far too much control traffic and they are only capable of accepting a few topology changes per minute.

Two kinds of routing protocols have been suggested, namely reactive protocol and proactive protocols.

Reactive protocols do not need to exchange control data in the absence of data traffic. The route discovery procedure is invoked on demand when a source has a new connection pending toward a new destination. The route discovery procedure normally consists of flooding a query packet and the return of the route by the destination. The amount of flooding can be very extensive and hence expensive and also create delays in route establishment. Additionally, route discovery via flooding does not guarantee any optimal route in terms of hop distance.

Proactive protocols, such as optimized link state routing (OLSR), need periodic updates with control packets and therefore generate additional traffic which adds to the actual data traffic. The control traffic is then broadcast throughout the network via optimized flooding which is possible since nodes permanently monitor network topology. OLSR uses multipoint relay flooding which significantly reduces the cost of such broadcasts. OLSR, for example described in "Optimized Link State Routing Protocol", RFC (Request For Comment) 3626 by T. Close and P. Jaquette et.al, October 2003.

OLSR inherits the concept of the link state algorithm, for example "OSPF version 2, " IETF Request For Comments 2328, April 1998 by J. MOY, and uses shortest path first forwarding. It exchanges topology information with other nodes of the network periodically and every node maintains the topology information for the whole network. The routes are computed based on such topology information held by the nodes. Since it is proactive, as discussed above, routing is available immediately when needed.

However, OLSR implements a concept of forwarding and relaying from HIPERLAN (a MAC layer protocol, Medium Access Control, as standardized by ETSI, for example ETSI STC-RES 10 Committee, Radio Equipment and Systems: High Performance Radio Local Area Network (HIPERLAN) Type 1, functional specifications, June 1996. It uses MPR, cf. for example "Performance of Multipoint Relaying in ad hoc mobile routing protocols", Networking 2002, Pise, Italy 2002 by P. Jacket, A. Laouiti, P. Minet, L. Viennot, to optimize flooding. Each node selects a set of its neighbour nodes as its MPRs. In OLSR only MPR nodes are responsible for forwarding control traffic intended for diffusion into the entire network, which has a consequence that the number of transmissions required is reduced. Nodes selected as MPRs by some neighbour node or nodes, announce such "MPR selector" information periodically in their control messages. This means that a node announces its reachability to the nodes having selected it as an MPR. The reachability information is used to calculate routes from a given node to any destination in the network. This is more thoroughly described in IETF RFC 3626. OLSR in principle is a routing protocol based on a cross-layer design and it collects link state information and uses it to calculate routes and make optimization. However, since it collects link level information with IP layer HELLO packets, the layers are not crossed in implementation.

In order to improve OLSR, QOLSR as described in "Quality of Service for ad hoc Optimized Link State Routing protocol (QOLSR)", has being suggested by Hakim Bades, Khaldoun Agha, Draft-Badis-Manet-QOLSR-Ol.txt, April 2005. QOLSR provides optimal QOS routing functionalities in terms of available bandwidth and delay and it also uses MPR to minimize control traffic. QOLSR only requires partial link state and corresponding QoS information to be flooded in order to provide optimal routes under QoS constraints as those in the whole network topology. All nodes selected as MPRs must declare the link QoS information to their MPR selectors using TC (Topology Control) messages. QOLSR improves OLSR in that in neighbour sensing, each node estimates the QoS conditions (available bandwidth, delay, loss probability, cost, security, power consumption etc.) on links to each neighbour having a direct and symmetric link. The TC messages are extended in that QoS conditions of the links between the node and its MPR selectors are added into the data structure. The routing table is built from such a database using a loop-free shortest widest path algorithm to find a path with maximum bandwidth using a variant of Dijkstra routing algorithm. If there is more than one widest path, the one with the shortest path delay is chosen.

In another modification or extension of OLSR, a service discovery mechanism suggested. A new message type is then defined to handle the functionality of service discovery, service location extension (SLE). Service queries and responses are forwarded implementing the forwarding mechanism of MPR. SLE is used to automatically discover architecture and locate servers.

However, all suggested modifications or extensions of OLSR, are based on creation of private message types and design of private tables in order to support new services, cf.

SLE as discussed above. A similar approach is adapted by a so called plug-in design in OLSR. The OLSR plug-in provides access to the necessary functionality in the OLSR daemon. The user can add new functions to OLSR by linking a plug-in into the daemon without changing OLSR daemon code. However, in order to guarantee the stability of the OLSR daemon, the internal tables are read-only tables which are private and private message types are created. Although such designs are flexible for individual plug-in developers and the daemon is kept stable, these improvements are provided at the cost of increased complexity and configuration and increased control overhead in terms of number of control messages.

Moreover, for implementation of OLSR plug-ins, the OLSR daemon has to add two timers for each plug-in or service, one for state time out and the other for message generation. Each timer has its own timer interval. For example, for an OLSR daemon with 5-10 plug-ins, this means that the configuration and the maintenance will be complex. As furthermore each plug-in implements private messages, the control overhead will be considerably increased which may produce congestion, particularly in networks with scarce network resources.

SUMMARY

It is therefore an object of the present invention to suggest a solution to overcome the above mentioned problems and which still does not involve any increased complexity and configuration i.e. a simple configuration through which the control overhead in terms of control message numbers can be kept low. Furthermore a solution is needed through which it is easy to add new functions and services. Even more particularly a solution is needed through which new function and services easily can be added without requiring changes of the OLSR daemon code. A solution is also needed through which the stability of the OLSR daemon can be guaranteed. Most particularly a solution is needed which does not require any private message types, nor the use of private tables. A solution is also needed through which maintenance can be provided for in a straight-forward manner. Still further a solution is needed which is flexible and is adaptable to more or less fastly growing networks while still providing for optimal routing functionalities, for example in terms of available bandwidth and delay. Most particularly an object of the present invention to suggest a network node through which one or more of the above mentioned objects can be achieved as well as a routing protocol and a method of routing IP-packets in a network, particularly wireless mobile ad hoc network.

Therefore a network node, which is adapted to be arranged in a mobile wireless network, is suggested, which comprises routing means for routing IP-traffic supporting a proactive optimized link state routing protocol adapted to implement multipoint relaying for distribution of first and second control messages via broadcast. Said first control messages particularly comprise messages, e.g. hello messages, containing neighbour information and link status information for links to said neighbours and said second control messages particularly comprise topology control (TC) messages comprising information relating to multipoint relay selectors selected by respective network nodes.

The network node further comprises internal information holding means comprising repositories for holding information relating to neighbours, link state and multipoint relay selectors. The respective internal information repositories are adapted to be extended to additionally hold resources related information for the respective neighbours, neighbour links and multipoint relay selectors. According to the invention, further a shared information repository is provided which is adapted to hold generic service related information. The routing means with the routing protocol is adapted generate and handle extended first control messages, for example hello messages or messages with a similar functionality, further comprising resource related information and extended second control messages, particularly TC messages or messages with a similar functionality, adapted to additionally hold the, or selected parts of, the information of the shared information repository, in addition to service related information.

In a particular implementation, a first of the extended internal information repositories comprises an OLSR MPR selector set holding repository holding, for each MPR selector set entry, an MPR selector address with multiple Resource ID, Resource State Value, Resource Valid Time triplets. Alternatively or additionally a second of the extended internal information repositories comprises an OLSR Link Set holding repository holding, for each link set entry, a local interface address, a neighbour interface address and multiple Resource ID, Resource State Value, Resource Valid Time triplets. Further a third of the extended internal information repositories comprises an OLSR neighbour set holding repository holding, for each neighbour set entry, a neighbour address and multiple Resource ID, Resource State Value, Resource Valid Time triplets. Still further, a fourth of the extended internal information repositories that optionally may be provided comprises an OLSR 2-hop neighbour set holding repository holding, for each 2-hop neighbour set entry, a 2-hop neighbour address and multiple 2-hop neighbour Resource ID, Resource State Value, Resource Valid Time triplets. Not all of the internal information repositories are necessary as well as additional internal information repositories can be provided for example holding 3-hop neighbour sets etc. The resource related information may also take other forms, not all of the resource related information has to be provided or still further additional resource related information may be included in one or more of the internal information repositories. The internal repositories may also be implemented as one or more common repositories comprising some or all of the internal information repositories.

The shared information repository particularly comprises a data structure holding name/value pairs of attributes, adapted to allow read and write access and said attributes are adapted to be propagated to/from the network node by means of said control messages.

The routing means are particularly adapted to handle said extended first and second control messages. Said first extended control messages, for each neighbour address, are adapted to encapsulate a neighbour address and multiple Resource ID, Resource State Value tuples and said second extended control messages are adapted to be extended by insertion of all, or parts of, the information of the shared information repository, e.g. a table, and for each MPR selector address, multiple Resource ID and Resource State Value pairs.

The network node, or more particularly the protocol supported by the routing means, may with advantage be adapted to support a plug-in functionality for adding services or functionalities. The extended information repositories are adapted to present information to a plug-in as read-only information and information generated by a plug-in is adapted to be written into the shared information repository for propagation by means of said second control messages. The additional, shared information repository is adapted to offer read/write access to a plug-in via a pointer.

The shared information repository is particularly shared by, or common to, the protocol daemon and external or internal services or plug-ins. Most particularly a single timer is used for polling state information for a plurality of services or plug-ins.

In a preferable implementation the protocol is a cross-layer structure protocol comprising a medium access control layer (MAC) interfacing a physical layer and disposed below an application layer, the routing means comprising information collecting means adapted to collect information and/or perform measurements on lower as well as higher protocol layers, for example to collect information relating to loss of packets in the medium access control layer and link quality related information in the physical layer. This enables carrying out of congestion control in a transport layer separate from routing in a network layer. Even more particularly the protocol comprises sublayers provided between the application layer and the MAC layer, said sublayers comprising interfaces for higher and lower layers to provide for cross-layer communication, i.e. communication across the layers and exchange of layer specific information between the layers. The sublayers particularly comprise a routing sublayer, a network knowledge sublayer and a MAC knowledge sublayer. The routing means, i.e. the routing protocol supported thereby, may comprise message type detecting means and the routing means are adapted to implement default forwarding of messages of unknown type by implementation of MPR. In some implementations the protocol implemented by the routing means is additionally adapted to support a reactive mode for propagation of messages or queries with extended second control messages via broadcast, which can be responded to.

Most particularly the node comprises a node adapted to be provided in a mobile ad hoc network.

According to the invention also a proactive optimized link state routing protocol adapted to implement multipoint relaying for distribution of first and second control messages via broadcast in a network, for example a wireless ad hoc network, is provided. The protocol comprises a cross-layer structure. The first control messages particularly comprise hello messages or similar messages adapted to contain neighbour information and link state information extended with resource related information, said second control messages comprise topology control, particularly so called TC, messages adapted to contain information relating to multipoint relay selectors selected by respective network nodes. Said second control messages are extended with resource related information and information contained in shared information holding means comprising a repository common for the daemon of the protocol and services or plug-ins. The routing protocol further relies on internal information holding means or repositories holding information relating to neighbours, link status and multipoint relay selectors, which internal information repositories further are extended to hold resource related information for the respective neighbours, neighbour links and multipoint relay selectors and the extended second control messages are adapted to be broadcasted and retransmitted by the respective MPR selectors. The internal information holding means, the shared information holding repositories and the messages may be constituted as described earlier in the application.

Particularly the routing protocol is adapted to generate first extended control messages by, for each neighbour address, encapsulating multiple Resource ID and Resource State Value tuples and to generate second control messages by inserting a selected part of, or the entire information of, the shared information table or repository after header information in the second control message and adding multiple Resource ID and Resource State Value pairs to each MPR selector address. Advantageously the routing protocol is adapted to support addition of new services and functionalities by means of plug-ins. A plug-in is provided with read-only access to the extended internal information and the plug-in is further provided with read/write access to the shared information repository by means of a pointer, the information of the plug-in being adapted to be written into the shared information repository and propagated by said second control messages. According to the invention the shared information repository is shared by, or common to, the protocol daemon and additional services, functionalities, which may be provided to be implemented as plug-ins. In an advantageous implementation the routing protocol is adapted to implement a single timer for polling state information for a plurality of plug-ins or services. As also discussed above, the routing protocol is a so called cross-layer structure wherein sublayers are provided between the application layer and the MAC layer, which sublayers preferably comprise interfaces for higher and lower layers to provide for cross-layer communication and exchange of layer specific information between layers. The sublayers preferably comprise a routing sublayer, a network knowledge sublayer and a MAC knowledge sublayer, where the two latter sublayers can be said to wrap the routing sublayer. Particularly the routing protocol is adapted to provide for message type detection and to implement default forwarding of messages of unknown types by means of the MPR technology. Additionally it may, (in addition to act proactively) support a reactive mode as well for propagation of messages or queries with extended second control messages via broadcast.

It is an advantage of the invention that services can be provided in a new way instead of for example by creating new message types, (extending TC messages as carriers to propagate information), particularly in order to reduce the number of control messages. The number of control messages can particularly be considerably reduced since information from different services is bundled into one packet. Such a bundling mechanism can also reduce the amount of control traffic calculated by bytes. In certain cases, the refresh interval of the service required may be smaller than the TC interval which may require the TC interval to be reduced. Further, instead of using private tables, information repositories between the XOLSR daemon and other services are provided which particularly reduces the complexity as far as timers are concerned.

Due to the shared information repository between daemon and additional services, the timer mechanism will be simplified since the state information of multiple services can be polled by a single timer. This is very advantageous. Is is also an advantage that duplication is reduced since for example each plug-in or service may be provided with information propagation capabilities.

BRIEF DESCRIPTION OF THE DRAWINGS

The invention will in the following be further described, in a non-limiting manner, and with reference to the accompanying drawings, in which.

DETAILED DESCRIPTION

According to the present invention an extensible optimized link state routing protocol, which in the following will be denoted XOLSR, is suggested as well as a network node, i.e. any network node, comprising a routing means supporting such a protocol. XOLSR extends the existing design principle of OLSR as discussed above through actually applying the cross-layer design between application layer, network layer and MAC layer, cf. FIG. 1, which shows an application layer 1 and a MAC layer 3, between which XOLSR 2 is implemented comprising a network knowledge sublayer $2_1$, a routing sublayer $2_2$ and a MAC knowledge sublayer $2_3$ as will be further discussed below. Like QOLSR, XOLSR extends standard OLSR messages and internal tables to support information propagation. However, the information repositories of XOLSR are generic and not limited to QoS metrics as is the case of QOLSR and, moreover, there is no need to change any code in the XOLSR daemon in order to add custom packages or functionality and users are free to implement XOLSR daemon plug-ins according to their requirements as will be more thouroughly discussed below.

In addition thereto XOLSR provides a better cross-layer design between all layers. Furthermore, based on shared information repositories, XOLSR provides flexible routing policies which are easily adaptable to network conditions.

Figure 1:
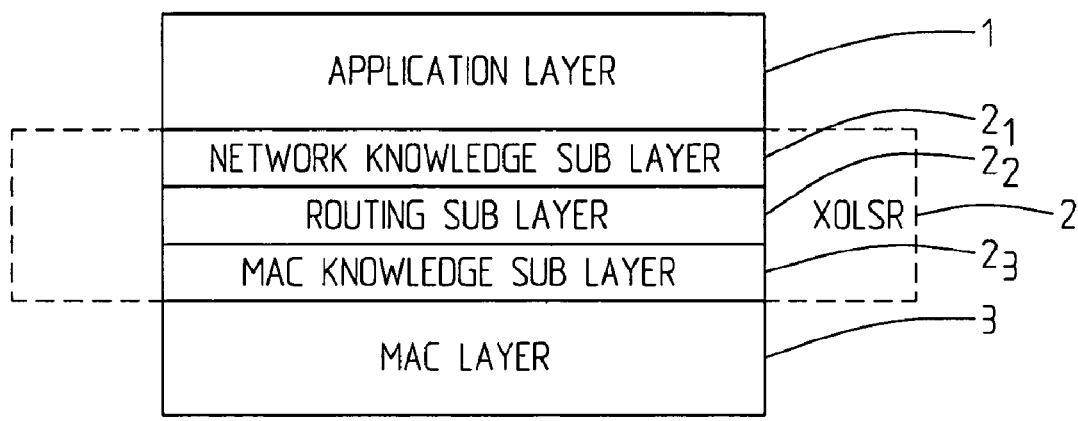
FIG. 1 illustrates the cross-layer design of an extended OLSR protocol (XOLSR) according to the present invention, FIG. 2 schematically illustrates the extended and shared information repositories provided in the routing means of a node supporting XOLSR according to the present invention, FIG. 3 schematically illustrates an extended first internal information repository for MPR selector set according to the present invention, FIG. 4 schematically illustrates an extended second information repository for extended OLSR link set according to the present invention, FIG. 5 schematically illustrates an extended third internal information repository, extended OLSR neighbour, according to the present invention, FIG. 6 schematically illustrates the structure and format of the shared information repository according to the present invention, FIGS. 7A,7B schematically illustrate the format of a conventional and a first control message (hello message) respectively, extended according to the present invention respectively, FIGS. 8A,8B schematically illustrate the format of a conventional and a second control message (TC) extended according to the present invention respectively.

Through the suggested cross-layer design, cf. FIG. 1, XOLSR allows for, by means of collecting and measuring means comprised by or associated with the routing means, collection of the information by measurements from both lower protocol layers and higher protocol layers. For example it is possible to collect packet loss rate in the MAC layer and link quality in the physical layer, which for example enables congestion control to be performed in the transport layer whereas routing is performed in the network layer separately therefrom. It does however require support from the MAC layer and the physical layer. Further, it enables collection of information about node capacity and services the node are running which can be used in fault management and routing optimization and it accepts information passed from the application layer for the purpose of policy cooperation, autonomic configuration, failure detection, resource discovery and monitoring.

In the cross-layer design described in FIG. 1 there is no real integration between any layers but interfaces are added for higher layer and lower layers to enhance the cross-layer communication and share layer-specific information with other layers. The network knowledge sublayer $2_1$ and the MAC knowledge sublayer $2_3$ can be said to act like wrappers for the routing sublayer $2_2$. In this manner established layer design is kept, but, in addition thereto, cross-layer functionality can be implemented. Generally XOLSR is based on OLSR and generally inhabits all features thereof with as small changes as possible but it extends OLSR in a most advantageous manner enabling or providing for one or more of the above mentioned objects to be fullfilled.

Figure 2:
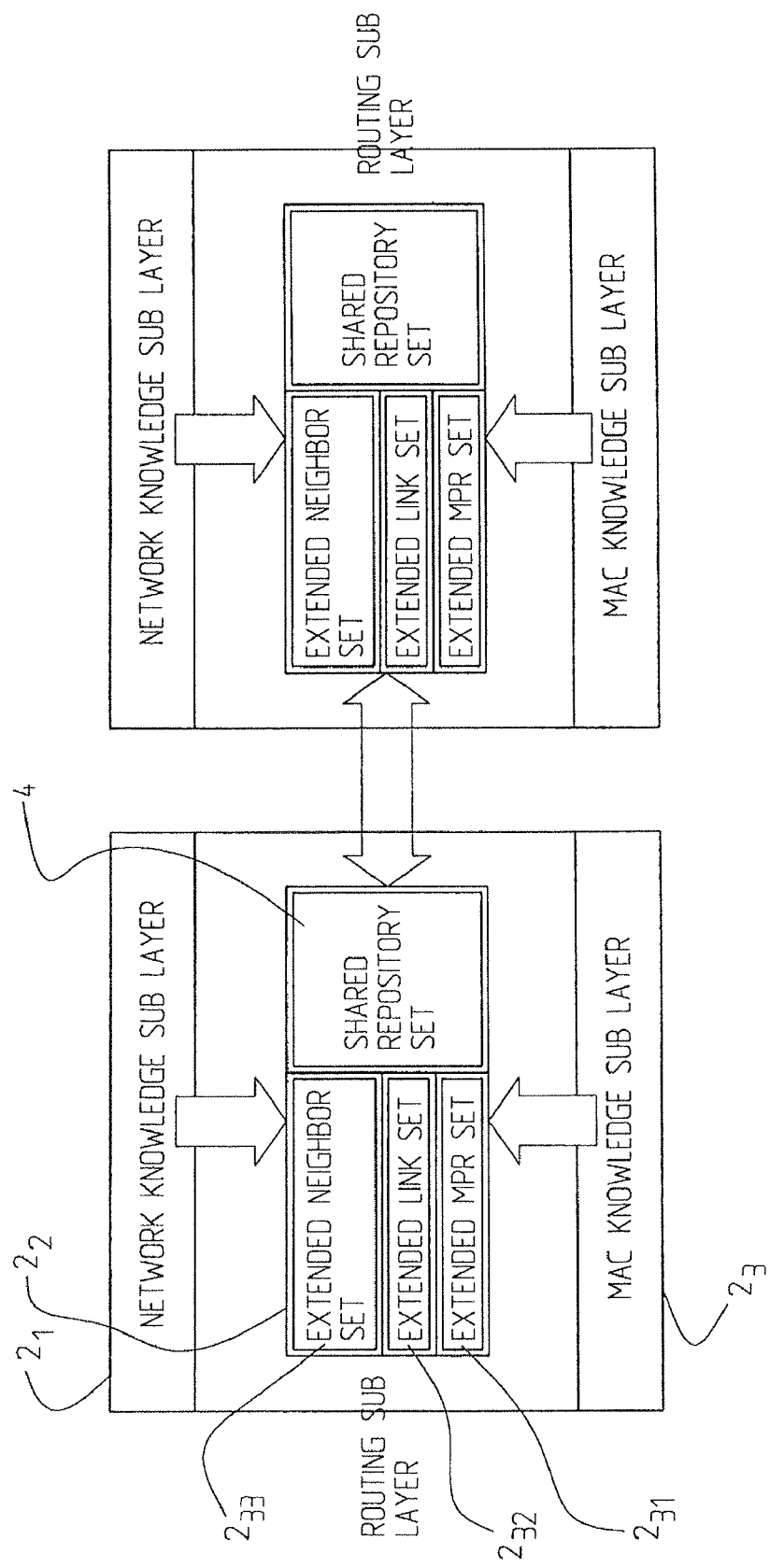

FIG. 2 schematically illustrates two communicating sets of information repositories in XOLSR, each including internal extended information repositories $2_{31}, 2_{32}, 2_{33}$, preferably but not necessarily also a respective further extended information repository relating to an extended 2-hop neighbour is provided (not shown). In addition thereto the respective shared information repository 4 is illustrated. Generally, there are two types of data in XOLSR, link status and node status. Link status is added into the link set, MPR set, and MPR selector set whereas node status is added into neighbour set and 2-hop-neighbour set. It should be noted that the existing internal tables of OLSR have been extended instead of incorporated into for example a shared information repository. Therethrough the number of changes required to enable implementation of XOLSR instead of OLSR is kept low.

The extended internal repositories or tables use generic link [attribute:value] pairs. Thus, XOLSR defines a number of extensions to existing information repositories as defined for OLSR in order to, among other things, allow for more generic information to be managed within the information repositories. As referred to above, preferably four information repositories are extended and a new shared information repository 4 is added.

FIG. 3 schematically illustrates an extended first internal information repository $2_{31}$ comprising an extended OLSR MPR selector set. Compared to the original or known OLSR MPR selector set containing MPR selector address and MPR selector valid time, the set is extended so that instead of a single MPR selector address/MPR selector valid time pair per set entry, there is MPR selector address with multiple Resource ID, Reosource State Value, Resource Valid Time triplets per set entry, as can be seen from the figure.

Figure 4:
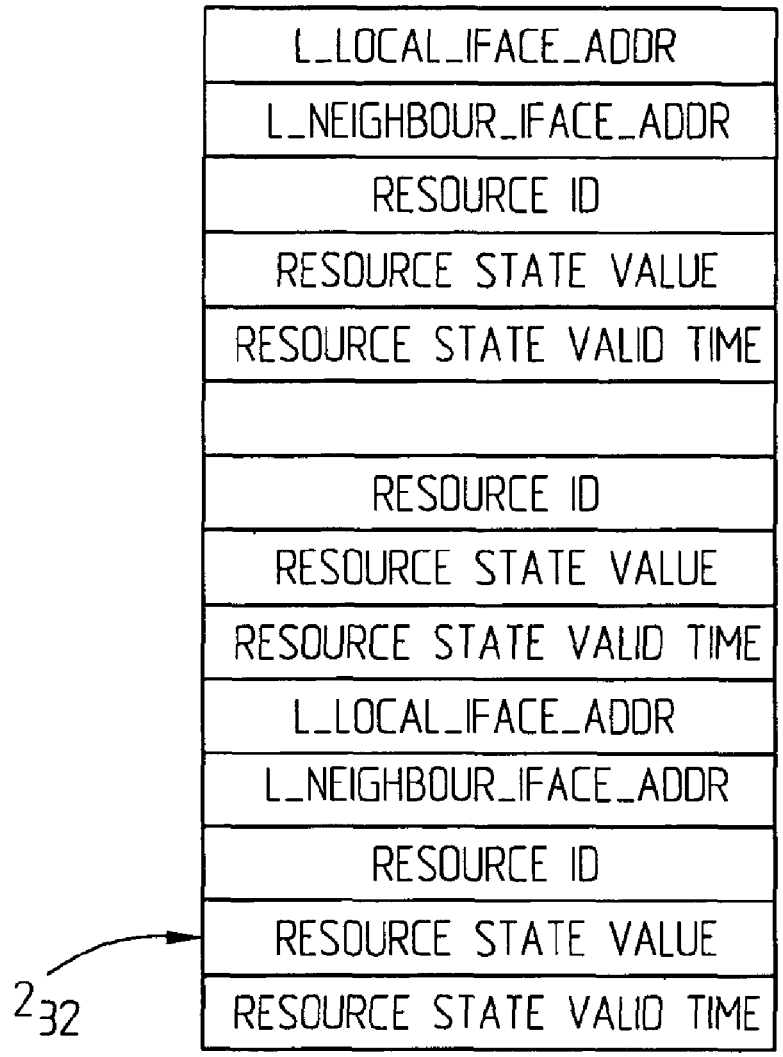

FIG. 4 shows an extended second information holding repository $2_{32}$ holding an extended OLSR link set information. Compared to the original or conventional OLSR link set, the set is extended so that each set entry consists of a L_local_iface_addr, L_neighbour_iface_addr and multiple Resource ID, Resource State Value, Resource Valid Time triplets instead of the single L_SYM_time, L_ASYM time and L_time triplet.

FIG. 5 shows an extended third internal information repository $2_{33}$ holding extended OLSR neighbour information. Compared to the conventional neighbour set, each set entry comprises a Neighbour Address and multiple Resource ID, Resource State Value, Resource Valid Time triplets instead of Neighbour Address, Neighbour Status and Neighbour Willingness triplets. Finally, not shown, a fourth extended internal information repository may be provided comprising extended 2-hop neighbour set, which is identical to extended neighbour set except that the neighbour is replaced by 2-hop neighbour. More generally the neighbour set and 2-hop neighbour set are extended by adding node status information into the respective table, hence providing extended tables. MPR selector set and link set are extended by adding link state information into the corresponding tables using the generic link, attribute value pairs.

As referred to above, additionally a new information repository 4 is added to provide a common storage area for generic information carried by first and second control messages. Particularly the first control messages comprise extended hello messages whereas the second control messages comprise extended TC messages.

Figure 6:

FIG. 6 schematically illustrates the format of the shared information repository 4. The shared information repository 4 is a completely new data structure which provides an area for read/write access of name/value pairs of attributes. These attributes can be propagated using the first and second control messages. This actually e.g. allows plug-in developers to add additional information to the XOLSR routing without having to create new propietary or private message types while still providing stability in the daemon. A plug-in architecture will be further discussed below. Examples of information collected by new services stored in the shared information repository may for example be power/energy information or in general any other desired information such as.

In an advantageous implementation first control messages are based on so called hello messages which are extended, and second control messages preferably comprise so called topology control, TC, messages which are extended such that propagation of generic information will be supported within the network, for example a mobile wireless ad hoc network.

FIG. 7A shows the format of a conventional or original OLSR hello message whereas FIG. 7B shows an extended OLSR, here denoted XOLSR, hello message according to the present invention. In extended hello messages, for each neighbour address, a Neighbour Address and multiple Resource ID, Resource State Value tuples are encapsulated. Extended hello messages according to the present invention have some fields which are the same as in conventional OLSR hello messages, such as Reserved, Htime, Willingness etc. An extended hello message used in XOLSR uses (Resource ID, Resource Value) attribute-value pairs instead of specific attributes such as bandwidth.

In OLSR the main tasks of hello messages are neighbour sensing and link status sensing. According to the present invention, the XOLSR protocol, in addition to sensing traditional link status, node status information such as for example power status and MAC/physical layer information is exchanged. One of the purposes thereof is to enable a neighbouring node to forcast node failure based on the status information of the nodes. The handover process of extended hello messages corresponds to the handover process implemented in OLSR. In XOLSR the neighbour information is read from the extended neighbour set. Upon reception of a hello message in the node, the node updates the neighbour information corresponding to the sending node. Particularly an algorithm is used corresponding to the algorithm used in OLSR and QOLSR. In addition thereto, in XOLSR it is provided for adding and updating of state information in neighbour set, 2-hop neighbour set and MPR selector set and the shared repository information set as referred to earlier, based on Resource (ID, Value) pair.

FIG. 8A shows an original or conventional OLSR TC message format and FIG. 8B shows an extended OLSR TC message according to the present invention. The original TC message is extended in that the full shared information repository table or parts thereof is/are introduced after the header information. Further, the MPR Selector Address entries are each replaced by the MPR Selector Address and multiple Resource ID, Resource State Value pairs. The TC messages are extended to carry generic information and it is e.g. sent by a node in the network to declare its status information. The extended MPR selector set is part of the information type, as shown in the message format, and in addition thereto a generic information block is defined. In OLSR, the daemon reads the MPR selector set and generates TC messages. In XOLSR, as discussed above, in addition to the MPR selector set, also parts of or all the information in the shared information repositories is added into the TC package. Particularly it can be specified for example by a user what information from the shared information repository or what information that should be broadcasted in the configuration of XOLSR. The extended TC messages are broadcasted and retransmitted by the MPRs in order to diffuse the information in the entire network. When a node receives an extended TC message, it updates its information repositories including topology set link set and shared repository set, i.e. the internal information repositories and the shared information repository.

Figure 9A:
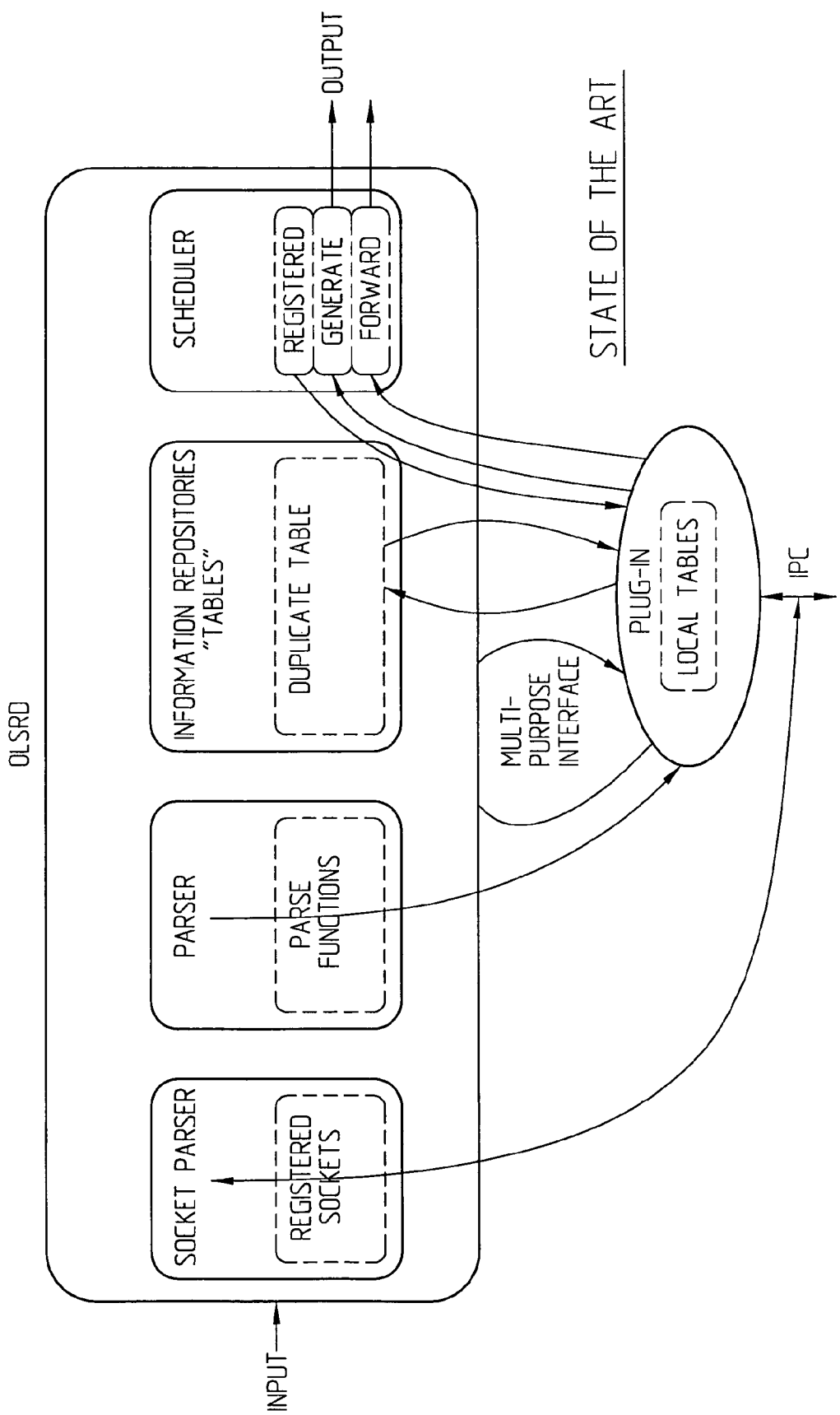
FIG. 9A shows the state of the art OLSR daemon.
Figure 9B:
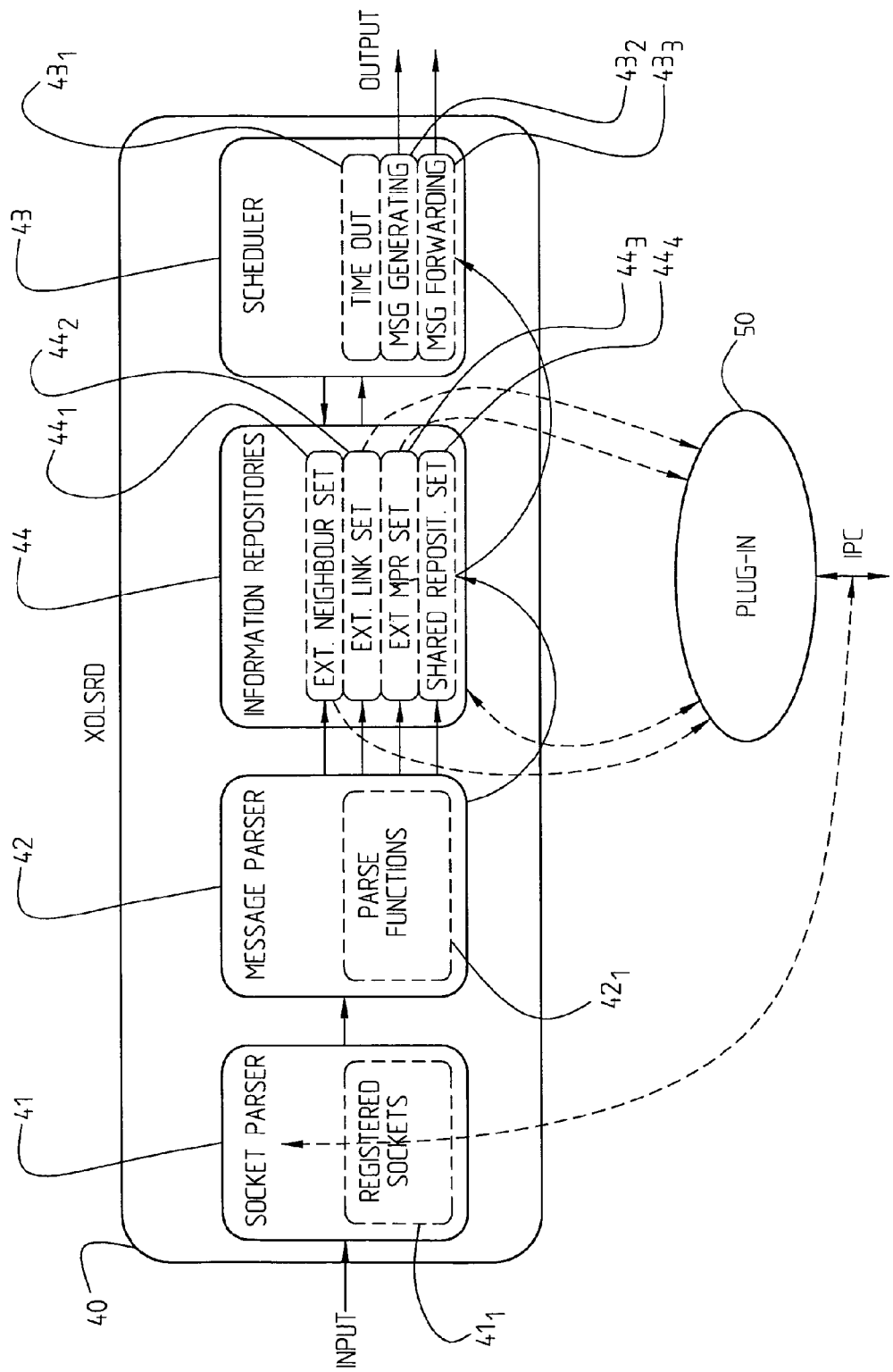
FIG. 9B shows an XOLSR daemon according to the present invention, and FIG. 10 schematically illustrates the control flow of the extended OLSR (XOLSR) according to the present invention.

FIG. 9A schematically illustrates an OLSR daemon whereas FIG. 9B shows an XOLSR daemon 40 comprising a socket parser 41 with means for holding registered sockets $41_1$, a message parser 42 with a parse function $42_1$, a scheduler 43 with a timer $43_1$, and message generating means $43_2$ and message forwarding means $43_3$ and in addition thereto the internal information repositories 44 as discussed above comprising for example an extended neighbour set information repository $44_1$, an extended link set information repository $44_2$, an extended MPR set repository $44_3$ and shared repository set information repository $44_4$ as more thoroughly discussed above. An extended 2-hop neighbour set repository may also be included (not shown).

As can be seen from Fig. 9B below, the plug-in 50 is hooked closely with XOLSR daemon 40. The plug-in 50 collects and writes information in the information repositories in the XOLSR daemon 40 as discussed above and the information will be propagated by the extended TC messages. In this respect a plug-in implemented in XOLSR in a similar manner as in OLSR as for example described in "the UniK-OLSR plugin library", OLSR Interop & Workshop 2004, San Diego, 6-7 August 2004 by Andreas Tonnesen et.al. However, some differences will be briefly discussed below. Generally the efficiency of XOLSR plug-in design is improved compared to known plug-in designs. First, the plug-in does not need to have any internal tables but instead it interacts with the information repositories inside the XOLSR daemon, read-only for the MPR selector, neighbour, 2-hop neighbour and link set repositories. The purpose thereof is to guarantee the stability of the XOLSR basic routing functionality. However, read/write access is provided via a pointer as far as the shared information repository table $44_4$ is concerned.

Furthermore, the plug-in does not generate any messages but the information generated by the plug-in will be written into the information repository when thus propagated by TC messages. Furthermore the plug-in in XOLSR does not register a message parser since it does not have any private messages.

A default forwarding algorithm as described with reference to FIG. 10 allows for forwarding of XOLSR messages of unknown types. This means that even if only a subset of the nodes in the network actually knows to interprete a certain message types, all nodes will forward them according to the MPR mechanism.

Figure 10:
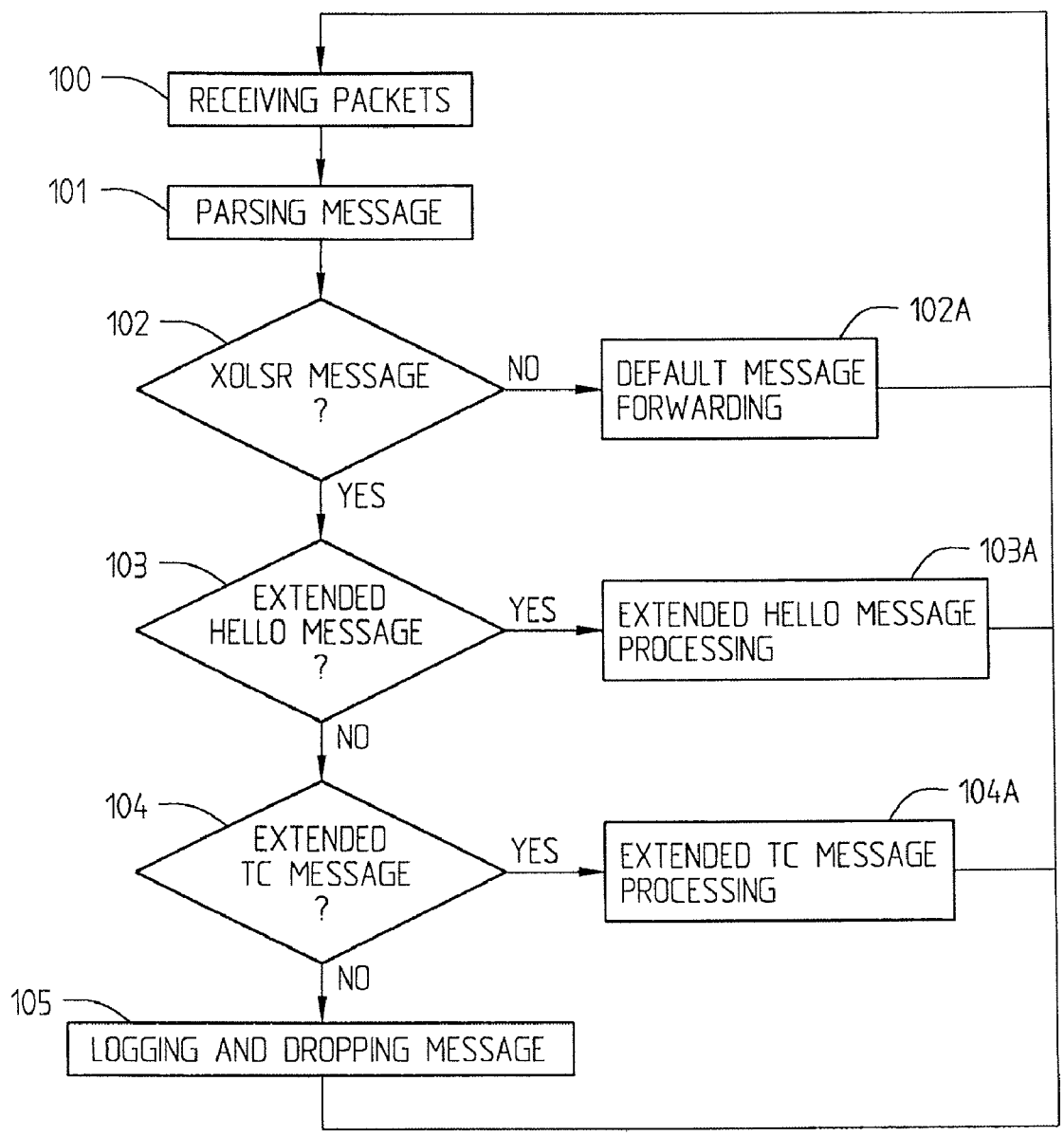

FIG. 10 is a schematical flow diagram describing a high level control flow for XOLSR. It is based on an extended OLSR algorithm. The processing involves, as far as the extended first control (hello) message is concerned, updating generic information for the neighbour set, 2-hop neighbour set, MPR selector set and the shared information repository information based on the Resource (ID, Value) pair contained in the message.

As far as the extended second control message, (TC) is concerned, the processing involves the additional step of adding the shared information repository table information as discussed above into the extended second control message as well as the more generic MPR selector set tuples as also discussed above. Thus, the high level control flow comprises the steps of, upon reception of packets belonging to a message, in a node, 100, parsing the message, 101, examining if the message is an XOLSR message, 102, which can be done in different manners, for example through establishing if the additional information is contained. If it is not, default message forwarding, 102A, is implemented using MPR. If on the other hand it is established that the message is an XOLSR message, it is established if it is an extended first control (hello) message, 103. If yes, it is proceeded with extended hello message processing 103A as discussed above. If it is established that the message is not an extended hello message, it is established if it is an extended first (TC) control message, 104. If yes, it is proceeded with extended TC message processing, 104A, as discussed above and if not, the message or messages are logged and dropped, 105.

In the routing protocol suggested by the present invention, XOLSR, neighbouring sensing extends the functionalities as compared to for example QOLSR in that the metrics of the link are more flexible and based on a generic data structure. In addition thereto node status is exchanged with neighbouring nodes. In addition to neighbouring sensing, the collection of link status information, plug-ins may e.g. additionally be used to collect application layer and physical layer information by measurement. Such information will also be written into the shared information repository and propagated by extended TC messages. Thus, topology discovery propagation is extended or enhanced to diffuse information throughout a network. The shared information repository is polled by the daemon in order to remove obsolete state.

According to the present invention new services and functionalities can thus e.g. be added into XOLSR by writing a plug-in and there is no need to change any code in the XOLSR daemon. It further more allows applications to define their own events and event handlers. Plug-ins can be loaded dynamically based on the configuration of XOLSR.

Generally the XOLSR provides for basic link state routing functionality and collects topology information by sending periodical TC messages. The routing becomes flexible since XOLSR uses collected information to provide an optimal routing algorithm. In for example OLSR, the route is determined by OLSR itself and the algorithm of route calculation is itself rigid and only the shortest path first algorithm is adapted. On the contrary in XOLSR, applications or network administrators are allowed to define their own routing or calculation policy based on the information held by XOLSR. Shortest path first may work as a default routing algorithm. When for example delay information is available, XOLSR could instead provide for, for example smallest delay first routing functions. Based thereon the QoS routing becomes very flexible. Packets in XOLSR networks can be treated differentially by the routing protocol and be routed with different QoS policy, such as largest bandwidth first or shortest delay first etc.

Since in XOLSR a basic topology discovery and maintenance mechanism is kept, XOLSR is compatible with existing OLSR and QOLSR protocols which is advantageous. A user or a network administrator may implement optimized flooding to broadcast certain information, which may be routing related or not, to all nodes which know how to handle such messages. Services needing to broadcast/multicast data, can encapsulate data into TC messages which is very advantageous. Particularly plug-ins that may collect information from node level including node attributes, such as node functionalities as gateway or access point, node capacities form the network knowledge sublayer, and plug-ins operating to collect lower layer information such as for example signalling strength, may form the MAC knowledge sublayer.

In an advantageous implementation there are two stages for configuration. First the nodes that are willing to be configured by negotiation are found. Then the configuration information will be propagated using XOLSR. Such configuration information will be propagated when necessary.

XOLSR can also be used for failure/fault reporting. A negotiation initiator may for example specify which nodes attend the failure reporting. The failure/fault information will be propagated when there is such a failure. The interval of failure reporting can be varied. In one embodiment failure statistics are reported during a period, which corresponds to the times of the TC refresh interval. Reporting may also be done when there is a failure or a change, when there are few failure events in the network. It should be noted that for example OLSR only propagates existing link information (within the MPR selector set) and no failure information can be included.

In specific embodiments XOLSR supports implementation of resource discovery in two ways, proactively and passively. In the proactive mode, the node broadcasts its service and attributes by inserting such information into extended TC messages, whereas in reactive mode, XOLSR propagates queries with extended TC messages to each node and nodes may respond to the queries. Thus, both the proactive and the reactive mode may be supported, although in some embodiments only the proactive node is supported.

It should be clear that the invention is not limited to the specifically illustrated embodiments, but that it can be varied in a number of ways within the scope of the appended claims.

The invention claimed is:

1. A network node configured to operate in a mobile wireless network, the node comprising:
   a router configured to route IP-traffic, and to support a proactive optimized link state routing protocol that implements multipoint relaying for distribution, via broadcast, of first and second control messages, wherein said first control messages include messages having neighbor information and link status information for one or more neighbors, and wherein said second control messages include topology control messages that include information relating to multipoint relay selectors selected by respective network nodes; and
   an internal information storage configured to hold information relating to the one or more neighbors, link status, and the multipoint relay selectors, the internal information storage comprising:
      one or more extended internal information repositories configured to store resource-related information associated with respective neighbors, neighbor links, and multipoint relay selectors; and
      a shared information repository configured to:
         store generic service-related information; and
         generate and handle extended first control messages that include resource related information, and extended second control messages that include part or all of the information in the shared information repository and the resource related information.

2. The network node of claim 1 wherein a first extended internal information repository comprises an Optimized Link State Routing (OLSR) Multipoint Relaying (MPR) selector set holding repository configured to store an MPR selector set entry and corresponding MPR selector addresses having multiple Resource ID, Resource State Value, and Resource Valid Time triplets per MPR selector address.

3. The network node of claim 2 wherein a second extended internal information repository comprises an OLSR Link Set holding repository configured to store, for each link set entry, a local interface address, a neighbor interface address, and multiple Resource ID, Resource State Value, and Resource Valid Time triplets.

4. The network node of claim 3 wherein a third extended internal information repository comprises an OLSR neighbor set holding repository configured to store, for each neighbor set entry, a neighbor address and multiple Resource ID, Resource State Value, and Resource Valid Time triplets.

5. The network node of claim 4 wherein a fourth extended internal information repository comprises an OLSR 2-Hop neighbor set holding repository configured to store, for each 2-hop neighbor set entry, a 2-hop neighbor address and multiple 2-hop neighbor Resource ID, Resource State Value, and Resource Valid Time triplets.

6. The network node of claim 1 wherein the shared information repository comprises a data structure having read and write access and configured to store name/value pairs of attributes, said attributes being configured to be propagated to and from the node via said first and second control messages.

7. The network node of claim 1 wherein the router is configured to handle said first and second extended control messages, and wherein, for each neighbor address:
said first extended control messages are configured to encapsulate a neighbor address and multiple Resource ID and Resource State Value tuples; and
said second extended control messages are configured to be extended by inserting at least some of the information in the shared information repository and multiple Resource ID and Resource State Value pairs for each MPR selector address.

8. The network node of claim 1 further configured to support a plug-in functionality to add services or functionalities, and wherein the extended information repositories are further configured to:
present information to the plug-in as read-only information;
offer write access information generated by the plug-in such that said second control messages propagate the write access information; and
wherein the shared information repository is configured to offer read/write access to the plug-in via a pointer.

9. The network node of claim 1 wherein the shared information repository is either shared by, or common to, a protocol daemon and at least one of an external and internal service or plug-in.

10. The network node of claim 9 wherein the node is configured to use a single timer for polling state information for a plurality of services or plug-ins.

11. The network node of claim 1 wherein the protocol comprises a cross-layer structure protocol disposed below an application layer and having a medium access control layer (MAC) interfacing a physical layer, and wherein the router comprises an information collector configured to collect information and/or perform measurements on lower and higher protocol layers, and link quality related information in a physical layer to enable congestion control in a transport layer independently of the routing in a network layer.

12. The network node of claim 11 wherein performing measurements on lower and higher protocol layers comprises collecting information relating to data packet loss in the MAC.

13. The network node of claim 11 wherein the protocol comprises sublayers provided between the application layer and the MAC layer, said sublayers comprising interfaces associated with the higher and lower layers to provide for cross-layer communication and exchange of layer specific information between layers.

14. The network node of claim 13 wherein the sublayers comprise a routing sublayer, a network knowledge sublayer, and the MAC knowledge sublayer.

15. The network node of claim 1 wherein the router comprises a message type detector, and wherein the router is configured to implement default forwarding of messages of unknown type using MPR.

16. The network node of claim 1 wherein the network node comprises a node in a mobile ad-hoc network.

17. The network node of claim 1 wherein the proactive optimized link state routing protocol implemented by the router is configured to support a reactive mode to propagate one or more messages and queries with extended second control messages via broadcast.

18. The network node of claim 17 wherein the extended second control messages are Topology Control (TC) messages.

19. A network node configured to implement a proactive optimized link state routing protocol having a given protocol daemon configured to implement multipoint relaying for distributing first and second control messages via broadcast in a network, said protocol comprising a cross-layer structure, said node comprising:
a shared information holding device configured to use information stored in internal information holding repositories that store information associated with neighbors, link status, and multipoint relay selectors;
said internal information repositories being extended to further store resource related information for the respective neighbors, neighbor links, and multipoint relay selectors; and
said node being configured to implement the proactive optimized link state routing protocol comprising a cross-layer structure, wherein first control messages are configured to include neighbor information and link state information extended with resource related information, and wherein second control messages comprise topology control messages configured to include information associated with multipoint relay selectors selected by respective network nodes extended with resource related information, and information contained in the shared information holding device that includes a common repository associated with the protocol daemon and services or plug-ins; and
the extended second control messages being configured to be broadcasted and retransmitted by respective MPR selectors.

20. The network node of claim 19 wherein the network is a mobile ad hoc network.

21. The network node of claim 19 wherein a first extended internal information repository comprises an Optimized Link State Routing (OLSR) Multipoint Relaying (MPR) selector set holding repository configured to store an MPR selector set entry and corresponding MPR selector addresses with multiple Resource ID, Resource State Value, and Resource Valid Time triplets per MPR selector address.

22. The network node of claim 21 wherein a second extended internal information repository comprises an OLSR Link Set holding repository configured to store, for each link set entry, a local interface address and multiple Resource ID, Resource State Value, and Resource Valid Time triplets.

23. The network node of claim 22 wherein a third extended internal information repository comprises an OLSR neighbor set holding repository configured to store, for each neighbor set entry, a neighbor address and multiple Resource ID, Resource State Value, and Resource Valid Time triplets.

24. The network node of claim 23 wherein a fourth extended internal information repositories comprises an OLSR 2-Hop neighbor set holding repository configured to store, for each 2-hop neighbor set entry, a 2-hop neighbor address and multiple 2-hop neighbor Resource ID, Resource State Value, and Resource Valid Time triplets.

25. The network node of claim 19 wherein the shared information repository comprises a data structure having read and write access and that is configured to store name/value pairs of attributes, said attributes being configured to be propagated to and from the node via said first and second control messages.

26. The network node of claim 19 wherein the node is configured to implement the routing protocol to:
for each neighbor address, generate first extended control messages by encapsulating multiple Resource ID and Resource State Value tuples; and
generate second control messages by inserting at least a selected part of the information stored in a shared information table after message header information, and adding multiple Resource ID and Resource State Value pairs to each MPR selector address.

27. The network node of claim 19 wherein the routing protocol is configured to support addition of new services and functionalities using plug-ins, wherein a plug-in is provided with:
read-only access to an extended internal information repository;
read/write access to a shared information repository via a pointer; and
wherein the information of the plug-in is configured to be written into the internal information repositories, and to be propagated by the second control messages.

28. The network node of claim 27 wherein the second control messages are Topology Control (TC) messages.

29. The network node of claim 27 wherein the shared information repositories of respective nodes are shared by, or are common to, the protocol daemon and one or more additional services or plug-ins.

30. The network node of claim 29 wherein the routing protocol is further configured to implement, in a respective node, a single timer for polling state information for a plurality of plug-ins or services.

31. The network node of claim 19 wherein the cross-layer structure routing protocol implemented by the network node is disposed below an application layer and comprises a medium access control layer (MAC) interfacing a physical layer, and wherein the network node further comprises:
a router having an information collector configured to collect information and/or perform measurements on lower and higher protocol layers, and link quality related information in the physical layer, to enable congestion control in a transport layer independently of the routing in a network layer.

32. The network node of claim 31 wherein performing measurements on lower and higher protocol layers comprises collecting information relating to data packet loss in the MAC layer.

33. The network node of claim 31 wherein the routing protocol comprises sublayers provided between the application layer and the MAC layer, said sublayers comprising interfaces associated with the higher and lower layers to provide for cross-layer communication and exchange of layer specific information between layers.

34. The network node of claim 33 wherein the sublayers comprise a routing sublayer, a network knowledge sublayer, and the MAC knowledge sublayer.

35. The network node of claim 31 wherein the router comprises a message type detector configured to provide message type detection, and to implement default forwarding of messages of unknown message types by implementing MPR.

36. The network node of claim 19 wherein the routing protocol is configured to support a reactive mode to propagate messages and queries with extended second control messages via broadcast.

37. A method of routing IP packets in a network using a proactive Optimized Link State Routing Protocol implementing multipoint relaying (MPR) for distribution of first and second control messages using broadcast to periodically exchange topology information between nodes, whereby each node selects a set of neighbors as multipoint relays, and wherein said first control messages comprise messages having neighbor information and neighbor link state information, said second control messages comprise topology control messages including information related to multipoint relay (MPR) selectors selected by respective network nodes, the method comprising the steps of:
extending a first internal information holding repository storing information associated with an MPR selector set of a node, to additionally store resource related information of the respective MPR selectors of the set;
extending a second internal information holding repository storing link address information to additionally store resource related information of one or more respective links;
extending a third internal information holding repository storing neighbor address and status information to additionally store neighbor resource related information;
extending a fourth internal information holding repository storing 2-hop neighbor addresses and status information to additionally store 2-hop neighbor resource related information;
providing a shared information holding repository common to a protocol daemon and one or more services or plug-ins;
generating and extending first control messages to include resource related information comprising attribute value pairs;
generating and extending second control messages with at least selected parts of the information that is stored in the shared information repository and the resource related information associated with the MPR selectors; and
distributing the first and second control messages.

38. The method of claim 37 wherein the network is a mobile ad hoc network.

39. The method of claim 37 wherein a first control message is a hello message.

40. The method of claim 37 wherein a second control message is a Topology Control (TC) message.

41. The method of claim 37 further comprising the steps of, upon receiving an extended first control message in a receiving node from a sending node:
updating the neighbor information of the sending node; and
adding and updating resource and/or state information in the internal information repositories and the shared information repository based on one or more resource (ID, Value) pairs.

42. The method of claim 37 further comprising the steps of, upon receiving an extended second control message in a receiving node from a sending node:
- performing second extended control message processing by updating topology and link related information in the internal information repositories and shared information repository; and
- broadcasting and re-transmitting the extended second control messages via the MPRs throughout the network.

43. The method of claim 37 further comprising the step of adding a new service or functionality by implementing a plug-in by:
- providing the plug-in with read-only access to information stored in the internal extended information repositories;
- generating plug-in information using the information stored in the internal extended information repositories;
- providing the plug-in with a pointer to the shared information repository;
- providing the plug-in with read and write access to the shared information repository; and
- propagating the information of the plug-in through the network via the extended second control messages.

44. The method of claim 37 further comprising the steps of:
receiving a packet message;
parsing the packet message;
- if the packet message is an extended control packet message, examining the packet message and determining if the extended control message is an extended first control message;
- if the packet message is not an extended control packet message, implementing default message forwarding by implementing MPR;
- if the extended control message is an extended first control message, performing extended first control message processing;
- if the extended control message is not an extended first control message, examining the control message to determine whether the control message is an extended second control message;
- if the control message is an extended second control message, performing extended second control message processing;
- if the extended control message is not an extended second control message, logging and dropping the extended control message.

45. The method of claim 37 wherein the protocol supports a reactive node, the method further comprising propagating extended second control messages to each of one or more nodes to provide queries that can be responded to.

* * * * *

UNITED STATES PATENT AND TRADEMARK OFFICE
CERTIFICATE OF CORRECTION

PATENT NO.         : 8,094,583 B2
APPLICATION NO.    : 12/443715
DATED              : January 10, 2012
INVENTOR(S)        : Parker et al.

Page 1 of 1

It is certified that error appears in the above-identified patent and that said Letters Patent is hereby corrected as shown below:

On the Title page, Item (57), under "ABSTRACT", Line 11, delete "($2_{31i}$,"
and insert -- ($2_{31}$, --, therefor.

In Fig. 6, Sheet 6 of 11, delete "RESEVED" and insert -- RESERVED --, therefor.

In Column 2, Line 38, delete "O1.txt," and insert -- 01.txt, --, therefor.

In Column 2, Line 39, delete "QOS" and insert -- QoS --, therefor.

In Column 6, Line 60, delete "FIG. 1 illustrates" and
insert -- FIG. 1 schematically illustrates --, therefor.

In Column 7, Line 44, delete "thouroughly" and insert -- thoroughly --, therefor.

In Column 8, Line 42, delete "Reosource" and insert -- Resource --, therefor.

In Column 10, Line 29, delete "Fig." and insert -- FIG. --, therefor.

Signed and Sealed this
Nineteenth Day of June, 2012

David J. Kappos
*Director of the United States Patent and Trademark Office*